(12) United States Patent
Wu (10) Patent No.: US 11,782,505 B1
(45) Date of Patent: Oct. 10, 2023

(54) DYNAMIC CHANGING METHOD AND APPARATUS FOR VIRTUAL REALITY SCENE, AND ELECTRONIC DEVICE

(71) Applicant: QINGDAO PICO TECHNOLOGY CO., LTD., Shandong (CN)

(72) Inventor: Tao Wu, Shandong (CN)

(73) Assignee: QINGDAO PICO TECHNOLOGY CO., LTD., Shandong Province (CN)

( * ) Notice: Subject to any disclaimer, the term of this patent is extended or adjusted under 35 U.S.C. 154(b) by 0 days.

(21) Appl. No.: 17/816,372

(22) Filed: Jul. 29, 2022

Related U.S. Application Data (63) Continuation of application No. PCT/CN2021/118064, filed on Sep. 13, 2021.

(51) Int. Cl.
*G06F 3/01* (2006.01)
*G02B 27/00* (2006.01)
*G02B 27/01* (2006.01)

(52) U.S. Cl.
CPC ......... *G06F 3/013* (2013.01); *G02B 27/0093* (2013.01); *G02B 27/0101* (2013.01); *G02B 27/017* (2013.01); *G02B 2027/014* (2013.01); *G02B 2027/0138* (2013.01)

(58) Field of Classification Search
CPC . G06F 3/013; G02B 27/0093; G02B 27/0101; G02B 27/0137; G02B 27/014; G02B 27/017
See application file for complete search history.

(56) References Cited

U.S. PATENT DOCUMENTS

| | | | | |
|---|---|---|---|---|
| 2018/0008141 A1* | 1/2018 | Krueger | ............... | A61B 3/0025 |
| 2020/0143286 A1* | 5/2020 | Frank | ........................ | G06N 5/02 |
| 2020/0409455 A1* | 12/2020 | Wilson | ................. | G02B 27/017 |
| 2021/0257084 A1* | 8/2021 | Freeman | ................. | A42B 3/228 |
| 2021/0290053 A1* | 9/2021 | Tran | ........................ | A61B 3/10 |
| 2022/0179205 A1* | 6/2022 | Marcotte | ................ | G06N 20/00 |

FOREIGN PATENT DOCUMENTS

| | | |
|---|---|---|
| CN | 106327584 A | 1/2017 |
| CN | 106412563 A | 2/2017 |
| CN | 107656613 A | 2/2018 |
| CN | 108732746 A | 11/2018 |
| CN | 109613984 A | 4/2019 |
| CN | 109683701 A | 4/2019 |
| CN | 110413108 A | 11/2019 |
| CN | 111553972 A | 8/2020 |
| CN | 111831119 A | 10/2020 |
| CN | 113262464 A | 8/2021 |
| EP | 2947545 A1 | 11/2015 |

OTHER PUBLICATIONS

Search Report dated Jan. 6, 2022 for PCT Application No. PCT/CN2021/118064.

* cited by examiner

*Primary Examiner* — Ryan A Lubit (57) ABSTRACT

The present disclosure relates to a dynamic changing method and apparatus for a virtual reality scene, and an electronic device, which relate to the technical field of virtual reality. The dynamic changing method for the virtual reality scene comprises: acquiring eye tracking data of a user; acquiring a gaze area of the user in the virtual reality scene according to the eye tracking data; determining a scene modifiable area according to the gaze area; and modifying the scene data of the scene modifiable area.

21 Claims, 3 Drawing Sheets

DYNAMIC CHANGING METHOD AND APPARATUS FOR VIRTUAL REALITY SCENE, AND ELECTRONIC DEVICE

CROSS-REFERENCE TO RELATED APPLICATION

The present disclosure is a continuation application of PCT Application No PCT/2021/118064 filed on Sep. 13, 2021, which claims the priority of Chinese Application 202110431238.X, filed in the Chinese Patent Office on Apr. 21, 2021, and entitled "DYNAMIC CHANGING METHOD AND APPARATUS FOR VIRTUAL REALITY SCENE, AND ELECTRONIC DEVICE", the entire contents of which are herein incorporated by reference.

TECHNICAL FIELD

Embodiments of the present disclosure relate to the technical field of virtual reality, and more specifically, to a dynamic changing method and apparatus for a virtual reality scene, and an electronic device.

BACKGROUND

Virtual reality (VR) is an immersive technology, wherein users of this technology perceive a rendered virtual environment and virtual objects therein as if the perceived visual information is their current reality. When the user is immersed in the virtual environment, usually when wearing a head mount display (HMD), the user can interact with the virtual environment, which has a good immersion effect.

However, when the user starts virtual scene experience, there are changes to scene information such as update and addition of some information in the virtual scene, however, as the field of view of virtual reality and augmented reality of the head mount displays becomes larger and larger, the space available for dynamic scenes is becoming smaller and smaller, therefore a small change may also be discovered by the user, which will break the sense of immersion of virtual reality and affect the user experience.

SUMMARY

One purpose of the embodiments of the present disclosure is to provide a new technical solution of a dynamic changing method and apparatus for a virtual reality scene, and an electronic device.

According to a first aspect of the present disclosure, a dynamic changing method for a virtual reality scene is provided: acquiring eye tracking data of a user; acquiring a gaze area of the user in the virtual reality scene according to the eye tracking data; determining a scene modifiable area according to the gaze area; and modifying scene data of the scene modifiable area.

Further, the acquiring the eye tracking data of the user includes: acquiring motion data of an eye data collection apparatus itself and eye image data collected by the eye data collection apparatus; and obtaining the eye tracking data according to the motion data of the eye data collection apparatus itself and/or the eye image data collected by the eye data collection apparatus, wherein the eye tracking data includes a rotation direction of eyes and a open/closed state of the eyes.

Further, the acquiring the gaze area of the user in the virtual reality scene according to the eye tracking data includes: determining the gaze area of the user in the virtual reality scene according to a rotation direction of the eyes in the eye tracking data.

Further, the determining the scene modifiable area according to the gaze area includes: determining a non-gaze area in the virtual reality scene as the scene modifiable area according to position data of the gaze area in the virtual reality scene; or, determining an area within a preset range around the gaze area as the scene modifiable area.

Further, the modifying the scene data of the scene modifiable area includes: acquiring historical data of the gaze area, and judging a degree of attention of the scene modifiable area in the historical data of the gaze area; and in a case where the degree of attention is less than a threshold, the modifying the scene data of the scene modifiable area.

Further, the modifying the scene data of the scene modifiable area includes: in a case where it is determined that a open/closed state of eyes in the eye tracking data is closed, modifying the scene data of the scene modifiable area.

Further, the modifying the scene data of the scene modifiable area includes: acquiring virtual reality scene data in the gaze area; and matching corresponding modification content according to the virtual reality scene data.

According to a second aspect of the present disclosure, a dynamic changing apparatus for a virtual reality scene is further provided, includes: a data acquisition module, configured to acquire eye tracking data of a user; a gaze area determining module, configured to acquire a gaze area of the user in the virtual reality scene according to the eye tracking data; a modifiable area determining module, configured to determine a scene modifiable area according to the gaze area; and a scene modification module, configured to modify the scene data of the scene modifiable area.

According to a third aspect of the present disclosure, an electronic device is further provided, includes a virtual reality helmet, and a data collection apparatus and a processor arranged on the virtual reality helmet, wherein the data collection apparatus includes a tracking camera and an infrared light source, and the data collection apparatus is configured to collect eye image data of a user; and the processor is configured to implement the method according to any item in the first aspect.

According to a fourth aspect of the present disclosure, a computer readable storage medium is further provided, wherein a computer program is stored on the computer readable storage medium, and when executed by a processor, the computer program implements the method according to any item in the first aspect.

One beneficial effect of the embodiments of the present disclosure is that the rotation direction and the open/closed state of the eyes of the user are judged according to the eye tracking data, the gaze area of the user is determined according to the rotation direction of the eyes of the user, the scene modifiable area is obtained according to the gaze area, and after the scene modifiable area is obtained, the scene in the scene modifiable area is modified, in this way, the sight range of the user can be avoided, such that the dynamic modification is carried out in a relatively hidden state, so as to avoid breaking the sense of immersion of the user.

By means of the following detailed descriptions of exemplary embodiments of the present disclosure with reference to the drawings, other features of the embodiments of the present disclosure and advantages thereof will become clear.

BRIEF DESCRIPTION OF THE DRAWINGS

The drawings, which are incorporated in the specification and constitute a part of the specification, illustrate the embodiments of the present disclosure, and together with the descriptions thereof, serve to explain the principles of the embodiments of the present disclosure.

DETAILED DESCRIPTION OF THE EMBODIMENTS

Various exemplary embodiments of the present disclosure will now be described in detail with reference to the drawings. It should be noted that: unless specifically stated otherwise, the relative arrangement of components and steps, numerical expressions and numerical values set forth in these embodiments do not limit the scope of the present invention.

The following description of at least one exemplary embodiment is actually only illustrative, and in no way serves as any limitation to the present invention and its application or use.

The techniques, methods and devices known to those of ordinary skill in relevant arts may not be discussed in detail, but where appropriate, the techniques, methods and devices should be regarded as a part of the specification.

In all the examples shown and discussed herein, any specific value should be interpreted as merely exemplary, rather than as a limitation. Therefore, other examples of the exemplary embodiment may have different values.

It should be noted that: similar reference numerals and letters indicate similar items in the following drawings, and therefore, once a certain item is defined in one drawing, it does not need to be further discussed in the subsequent drawings.

An application scene of an embodiment of the present disclosure is how to modify data in a virtual reality scene without being perceived by a user, when the user is immersed in the virtual reality scene. Virtual reality is Virtual reality, VR technology, wherein the present embodiment can also be applied to an augmented reality, that is, Augmented Reality, AR scene.

Figure 1:
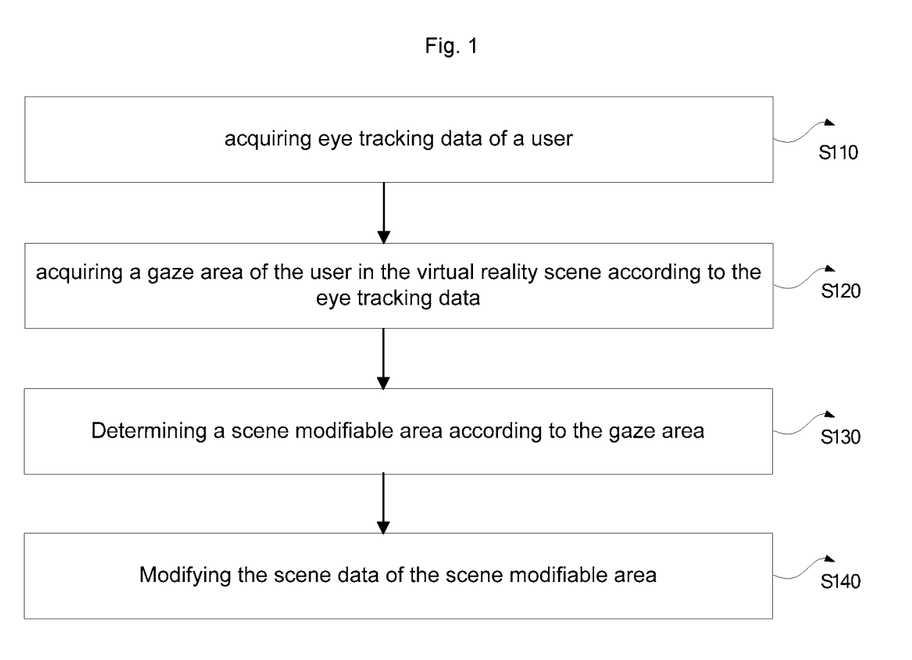
FIG. 1 is a schematic diagram of steps of a dynamic changing method for a virtual reality scene provided by the present invention.

The embodiment of the present disclosure provides a dynamic changing method for a virtual reality scene, with reference to FIG. 1, includes the following steps:

S110. acquiring eye tracking data of a user.

In order to hide changing that will be made in the virtual scene, in the present embodiment, an eye changing of the user is monitored by collecting eye data of the user, so as to obtain the eye tracking data of the user, and whether the sight of the user changing is judged according to the eye tracking data of the user, so as to determine a modifiable area of the virtual scene.

Specifically, the eye tracking data can be acquired by an eye data collection apparatus, the eye data collection apparatus can be a tracking camera component, such as a tracking camera, the eye image data of the user is collected by using the tracking camera, and whether the sight of the user changing is judged according to the positions of eyeballs in the eye image data.

In the present embodiment, it is necessary to firstly acquire motion data of the eye data collection apparatus itself and eye image data collected by the eye data collection apparatus; and obtain the eye tracking data according to the motion data of the eye data collection apparatus itself and/or the eye image data collected by the eye data collection apparatus.

The eye tracking data includes the rotation direction of eyes, specifically, the motion data of the eye data collection apparatus itself can be understood as the rotation data of the tracking camera itself when the tracking camera is photographing an eye image, in one embodiment, the rotation data of the tracking camera itself and the rotation and translation parameters of the central position of a display screen of a virtual reality helmet can be tracked, and since the eyes and the tracking camera are at relative positions, coordinate matrix conversion can be performed on the rotation and translation parameters of the tracking camera itself, so as to obtain the rotation direction of the eyes, for example, the eyes of the user move leftward or rightward.

In another optional embodiment, the motion data of eyeballs can also be determined by detecting the position changing of the eyeballs in the eye image on the basis of the positions of the eyeballs in the eye image.

In another optional embodiment, when the positions of the tracking camera and the eyeballs in the eye image both changing, at this time, it is necessary to acquire the motion data of the eyeballs according to the motion data of the eye data collection apparatus itself and the eye image data collected by the eye data collection apparatus together.

In addition, the eye tracking data includes the open/closed state of the eyes, specifically, the open/closed state of the eyes of the user can be acquired by performing image recognition on the eye image, for example, pupil size data is obtained through image recognition, whether the user is currently in eye opening and eye closing states is judged through the pupil size data, when the user closes the eyes, the data in the virtual reality scene can be changed, and whether the user is in the eye closing state for a certain time period can also be judged by judging the pupil size data within the certain time period, so as to further determine that the eyes of the user are closed within the current time period, and to ensure that the changing to the virtual scene will not be discovered by the user. The changing to the virtual scene can be operations such as changing colors, and adding patterns or texts.

It should be noted that the eye tracking data in the present embodiment can also be a gaze point of the user, the motion data of the eyes relative to the head of the user, and other data that can be obtained by the tracking camera itself or the collected image data.

S120: acquiring a gaze area of the user in the virtual reality scene according to the eye tracking data.

The above-mentioned tracking data includes the rotation direction of the eyes, and then after the rotation direction of the eyes is acquired, the gaze area of the user in the virtual reality scene can be determined according to the sight range of the eyes.

In an optional embodiment, the positions of the left eyeball and the right eyeball can be acquired respectively, with the front side of the eyeball as the center, sight areas within a preset angle range on the left and right sides are all areas that the user may pay attention to, and this area is the gaze area in the virtual scene.

S130: determining a scene modifiable area according to the gaze area; and in order to prevent the user from discovering the changing in the scene, then the scene modifiable area should avoid the gaze area, therefore, in the present embodiment, according to the position data of the gaze area in the virtual reality scene, the scene modifiable area is determined as a non-gaze area in the virtual reality scene, in a set of areas, that is to say, the scene modifiable area is a non-set of the virtual reality scene and the gaze area, for example, at this time, the sight of the user is on a right screen in the VR scene, then at this time, the probability of a left screen being paid attention is low, and then the left screen can be determined as the scene modifiable area.

Or, in another embodiment, since the visible area of the display screen of the virtual reality helmet is also definite, it is not always possible to see all the scene within one sight range, and then the scene modifiable area is determined as an area within a preset range around the gaze area. That is to say, a modifiable scene range closest to the gaze area is found, but it is not necessary to search for the modifiable scene in a large area, in this way, on one hand, the calculation amount can be reduced, and on the other hand, it is also conducive to purposefully displaying changing data that matches the content of the gaze area in the vicinity of the gaze area according to the content of the gaze area.

It should be noted that, in another optional embodiment, the gaze area can also be pre-judged, for example, after the gaze area is determined, an area that the user is about to observe next is judged through the specific scene in the gaze area, and this area is a pre-gaze area. Then, the pre-gaze area may become the area that the user is about to gaze next, so when the scene modifiable area is selected, the pre-gaze area can be avoided.

S140: modifying the scene data of the scene modifiable area.

It is conceivable that, after the scene modifiable area is determined, it is necessary to calculate the timing of modification and the content of modification, and then, the timing of modification can be calculated in the following manners:

The first manner is to calculate the timing of modification by judging the possibility of the scene modifiable area being paid attention by the user, specifically, in real applications, the sight of the user is uncontrollable, but when the user frequently pays attention to an area, it means that the user is more interested in this area, then the possibility of gazing the area again is high, so in order to ensure that this area will not be discovered by the user during the process of changing the scene, the historical data of the gaze area can be acquired, and the degree of attention of the scene modifiable area in the historical data of the gaze area is judged; and in a case where the degree of attention is less than a threshold, the scene data of the scene modifiable area is modified. That is to say, when the degree of attention of the scene modifiable area in the historical data obtained in S130 is relatively small, it is defaulted that the possibility of being paid attention in the future is also small, and then the specific data in the scene modifiable area can be changed at this time.

In the second manner, when it is determined that the open/closed state of the eyes in the eye tracking data is closed, it is conceivable that when the eyes of the user are closed, the possibility of the modification to the scene data of the scene modifiable area being discovered by the user is relatively small.

After the timing of modification is determined above, the specific content needs to be modified, in the present embodiment, the virtual reality scene data in the gaze area can be acquired, and corresponding modification content can be matched according to the virtual reality scene data. For example, if there is a dinosaur in the current gaze area of the user, whether the user is interested in the dinosaur can be judged according to the gaze time length data of the user, when it is determined that the attention time of the user on the gaze area is relatively large, for example, greater than 3 seconds, it is determined that the user is quite interested in the dinosaur, then a detailed explanation of the dinosaur can be added in the scene modifiable area, for example, the growth environment of the dinosaur and other introduction information, the information can be stored in a processor in advance according to the specific data in the virtual reality scene, and it can also be acquired through the cloud.

In the present embodiment, by acquiring the eye tracking data, the rotation direction and the open/closed state of the eyes of the user are judged according to the eye tracking data, the gaze area of the user is determined according to the rotation direction of the eyes of the user, the scene modifiable area is obtained according to the gaze area, after the scene modifiable area is obtained, the timing of modification is determined according to the degree of attention of the scene modifiable area in the historical data or the open/closed state of the eyes, and the specific modification data of the scene modifiable area is determined through the scene in the gaze area, in this way, the sight range of the user can be avoided, such that the dynamic modification is carried out in a relatively hidden state, so as to avoid breaking the sense of immersion of the user.

Figure 2:
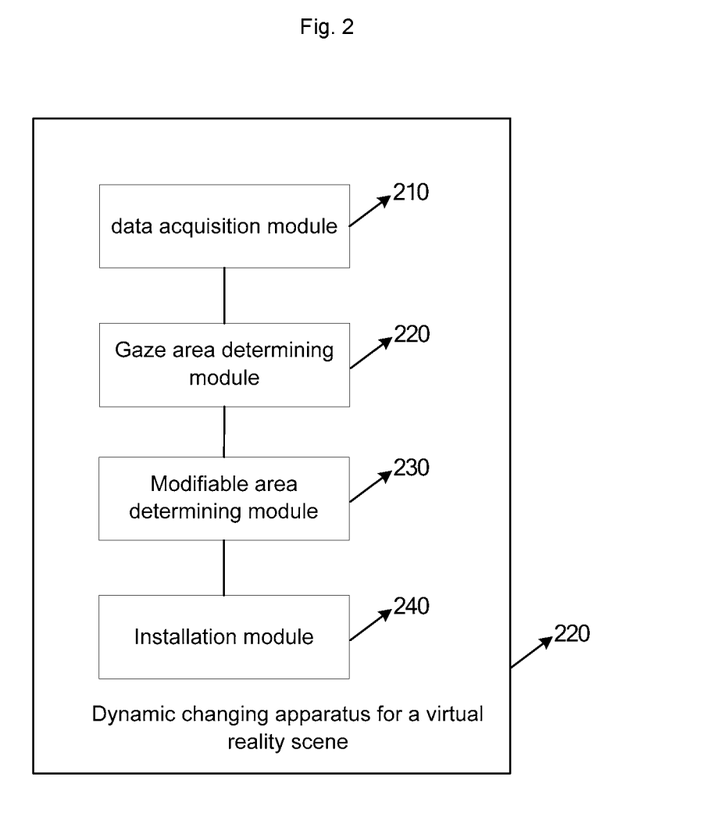
FIG. 2 is a schematic structural diagram of a dynamic changing apparatus for a virtual reality scene provided by the present invention.

Referring to FIG. 2, the present embodiment provides a dynamic changing apparatus 200 for a virtual reality scene includes:

a data acquisition module 210, configured to acquire eye tracking data of a user, wherein the eye tracking data can be acquired by an eye data collection apparatus, the eye data collection apparatus can be a tracking camera component, such as a tracking camera, the eye image data of the user is collected by using the tracking camera, whether the sight of the user changing is judged according to the positions of eyeballs in the eye image data, the specific functions of this module are described in the above step S110, and thus will not be repeated here.

A gaze area determining module 220, configured to acquire a gaze area of the user in the virtual reality scene according to the eye tracking data, wherein the gaze area of the user in the virtual reality scene can be determined according to the sight range of the eyes; and the specific functions of this module are described in the above step S120, and thus will not be repeated here.

A modifiable area determining module 230, configured to determine a scene modifiable area according to the gaze area, wherein the scene modifiable area includes position data of the gaze area in the scene modifiable area, and the scene modifiable area is determined as a non-gaze area in the virtual reality scene; or, the scene modifiable area is determined as an area within a preset range around the gaze area, the specific functions of this module are described in the above step S130, and thus will not be repeated here.

A scene modification module 240, configured to modify the scene data of the scene modifiable area, includes: acquiring historical data of the gaze area, and judging the degree of attention of the scene modifiable area in the historical data of the gaze area, or, in a case where the degree of attention is less than a threshold, modifying the scene data of the scene modifiable area, or, when it is determined that the open/closed state of the eyes in the eye tracking data is closed, modifying the scene data of the scene modifiable area, so as to determine the timing of modification.

Further, the module also acquires the virtual reality scene data in the gaze area; and matches corresponding modification content according to the virtual reality scene data, so as to determine the specific modification content. The specific functions of this module are described in the above step S140, and thus will not be repeated here.

In the present embodiment, by acquiring the eye tracking data, the rotation direction and the open/closed state of the eyes of the user are judged according to the eye tracking data, the gaze area of the user is determined according to the rotation direction of the eyes of the user, the scene modifiable area is obtained according to the gaze area, after the scene modifiable area is obtained, the timing of modification is determined according to the degree of attention of the scene modifiable area in the historical data or the open/closed state of the eyes, and the specific modification data of the scene modifiable area is determined through the scene in the gaze area, in this way, the sight range of the user can be avoided, such that the dynamic modification is carried out in a relatively hidden state, so as to avoid breaking the sense of immersion of the user.

Figure 3:
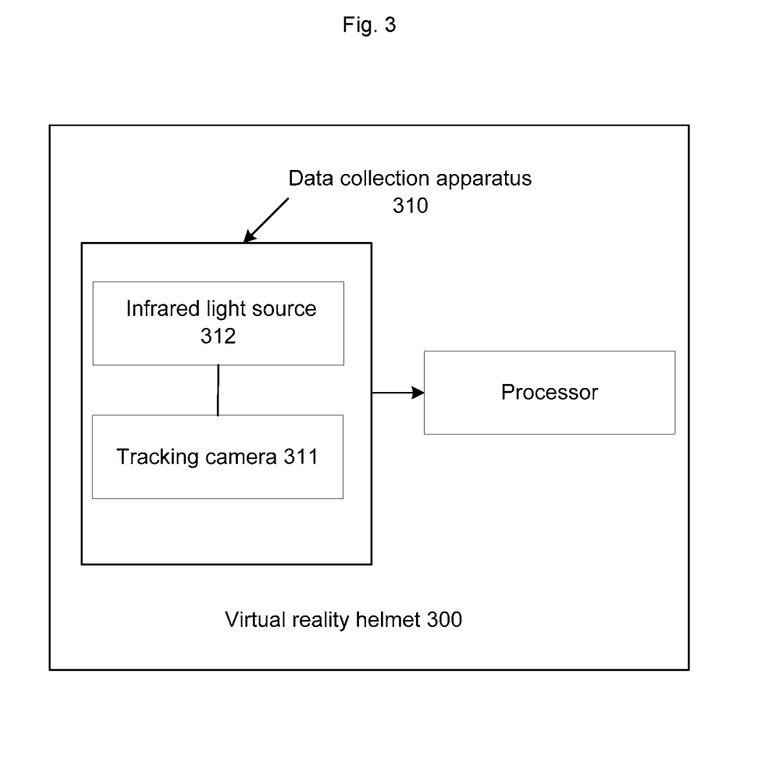
FIG. 3 is a schematic structural diagram of an electronic device provided by the present invention.

The present embodiment provides an electronic device, referring to FIG. 3, including a virtual reality helmet 300, and a data collection apparatus 310 and a processor 320 arranged on the virtual reality helmet, the data collection apparatus includes tracking cameras 311, configured to collect eye image data of a user; and two tracking cameras are provided and are respectively used for photographing and tracking the two eyes of the user in real time, and the main parameters of the tracking camera can include:

photographing frame rate: 60 Hz;

image resolution 640*480; and visible light band range that can be photographed: 400-900.

The two tracking cameras are physically synchronous, and the synchronization accuracy error is less than 50 us, that is, physically, the two cameras photograph eyeball information at the same time, the left camera photographs left eyeball information, and the right camera photographs right eyeball information. The tracking camera can be a color camera or a monochrome camera.

The data collection apparatus further includes infrared light sources 312, a group of 850 nm infrared light sources is respectively arranged around the two tracking cameras according to a certain rule and a certain number, the infrared light sources and the corresponding camera photographing frame rates are physically synchronous, that is, only when the shutter of each frame of camera is opened, the infrared light source will emit light, and when the shutter of the camera is closed and in other time periods, the light source will not emit light. Thereby, the image quality during eyeball photographing is improved, and the accuracy and stability of recognition can be improved.

The above-mentioned processor is configured to implement the dynamic changing method for the virtual reality scene in the above-mentioned embodiment, and is mainly used for acquiring eye tracking data of a user; acquiring a gaze area of the user in the virtual reality scene according to the eye tracking data; determining a scene modifiable area according to the gaze area; and modifying the scene data of the scene modifiable area, as well as the steps included in the dynamic changing method for the virtual reality scene mentioned in the above-mentioned embodiment.

The embodiment of the present invention further provides a computer readable storage medium, wherein a computer program is stored on the computer readable storage medium, and when executed by a processor, the computer program implements the dynamic changing method for the virtual reality scene.

The present invention can be a system, a method and/or a computer program product. The computer program product can include a computer readable storage medium, on which computer readable program instructions for enabling a processor to implement various aspects of the present invention are loaded.

The computer readable storage medium can be a tangible device that can hold and store instructions used by an instruction execution device. The computer readable storage medium can be, for example, but not limited to, an electrical storage device, a magnetic storage device, an optical storage device, an electromagnetic storage device, a semiconductor storage device, or any suitable combination of the above-mentioned devices. More specific examples (non-exhaustive list) of the computer readable storage medium include: a portable computer disk, a hard disk, a random access memory (RAM), a read-only memory (ROM), an erasable programmable read-only memory (EPROM or a flash memory), a static random access memory (SRAM), a portable compact disk read-only memory (CD-ROM), a digital versatile disk (DVD), a memory stick, a floppy disk, a mechanical encoding device, for example, a protruding structure in a punched card or a groove on which instructions are stored, and any suitable combination of the above-mentioned devices. The computer readable storage medium used here is not interpreted as a transient signal itself, such as radio waves or other freely propagating electromagnetic waves, electromagnetic waves propagating through waveguides or other transmission media (for example, optical pulses transmitted by optical fiber cables), or electrical signals transmitted by electrical wires.

The computer readable program instructions described herein can be downloaded from the computer readable storage medium to various computing/processing devices, or downloaded to an external computer or an external storage device via a network, such as the Internet, a local area network, a wide area network, and/or a wireless network. The network can include a copper transmission cable, an optical fiber transmission cable, a wireless transmission cable, a router, a firewall, a switch, a gateway computer, and/or an edge server. A network adapter card or a network interface in each computing/processing device receives the computer readable program instructions from the network, and forwards the computer readable program instructions for storage in the computer readable storage medium in each computing/processing device.

Computer program instructions used for executing the operations of the present invention can be assembly instructions, instruction set architecture (ISA) instructions, machine instructions, machine-related instructions, microcodes, firmware instructions, state setting data, or source codes or object codes written in any combination of one or more programming languages, and the programming language includes an object-oriented programming language such as Smalltalk, C++, and the like, and a conventional procedural programming language such as the "C" language or similar programming languages. The computer readable program instructions can be completely executed on a user computer, partially executed on the user computer, executed as independent software packages, partially executed on the user computer and partially executed on a remote computer, or completely executed on the remote computer or a server. In a case involving the remote computer, the remote computer can be connected to the user computer through any kind of network, includes a local area network (LAN) or a wide area network (WAN), or, it can be connected to the external computer (for example, connected via the Internet by using an Internet service provider. In some embodiments, an electronic circuit, such as a programmable logic circuit, a field programmable gate array (FPGA), or a programmable logic array (PLA), is customized by using the state information of the computer readable program instructions, and the electronic circuit can execute the computer readable program instructions, so as to implement various aspects of the present invention.

Here, various aspects of the present invention are described with reference to flow diagrams and/or block diagrams of the method, the apparatus (system) and the computer program product according to the embodiments of the present invention. It should be understood that, each block of the flow diagrams and/or block diagrams, and the combinations of various blocks in the flow diagrams and/or the block diagrams can be implemented by the computer readable program instructions.

These computer readable program instructions can be provided to the processors of general-purpose computers, special-purpose computers or other programmable data processing apparatuses, so as to produce a machine, in this way, these instructions, when executed by the processors of the computers or the other programmable data processing apparatuses, generate apparatuses for implementing functions/actions specified in one or more blocks in the flow diagrams and/or the block diagrams. These computer readable program instructions can also be stored in the computer readable storage medium, these instructions make the computers, the programmable data processing apparatuses, and/or other devices work in specific manners, thus, the computer readable medium storing the instructions includes a manufacture, which includes instructions for implementing various aspects of the functions/actions specified in one or more blocks in the flow diagrams and/or the block diagrams.

The computer readable program instructions can also be loaded on the computers, the other programmable data processing apparatuses or the other devices, such that a series of operation steps are executed on the computers, the other programmable data processing apparatuses or the other devices, so as to generate processes implemented by the computers, and thus the instructions executed on the computers, the other programmable data processing apparatuses or the other devices implement the functions/actions specified in one or more blocks in the flow diagrams and/or the block diagrams.

The flow diagrams and the block diagrams in the drawings show possible implementation architecture, functions and operations of the system, the method and the computer program product according to a plurality of embodiments of the present invention. In this regard, each block in the flow diagrams or the block diagrams can represent a part of a module, a program segment or an instruction, and the part of the module, the program segment or the instruction contains one or more executable instructions for implementing specified logic functions. In some alternative implementations, the functions marked in the block can also occur in a different order than the order marked in the drawings. For example, two consecutive blocks can actually be executed substantially in parallel, or they can sometimes be executed in a reverse order, which depends on the functions involved. It should also be noted that, each block in the block diagrams and/or the flow diagrams, and the combination of the blocks in the block diagrams and/or flow diagrams can be implemented by a dedicated hardware-based system that is used for executing specified functions or actions, or can be implemented by a combination of dedicated hardware and computer instructions. It is well known to those skilled in the art that, implementation through hardware, implementation through software, and implementation through a combination of software and hardware are all equivalent.

Various embodiments of the present invention have been described above, and the above descriptions are exemplary, not exhaustive, and are not limited to the disclosed embodiments. Without departing from the scope and spirit of the described embodiments, many modifications and changes are obvious to those of ordinary skill in the art. The choice of the terms used herein is intended to best explain the principles of the various embodiments, practical applications, or technical improvements on the market, or to enable others of ordinary skill in the art to understand the various embodiments disclosed herein. The scope of the present invention is defined by the appended claims.

The invention claimed is:

1. A dynamic changing method for a virtual reality scene, comprising:
   acquiring eye tracking data of a user;
   acquiring a gaze area of the user in the virtual reality scene according to the eye tracking data, wherein acquiring the gaze area of the user comprises determining the gaze area of the user in the virtual reality scene according to a rotation direction of eyes in the eye tracking data;
   determining a scene modifiable area according to the gaze area; and
   modifying scene data of the scene modifiable area,
   wherein determining a scene modifiable area according to the gaze area comprises:
      determining an area within a preset range around the gaze area as the scene modifiable area, and
      modifying scene data of the scene modifiable area comprises matching the modified content in the area within a preset range around the gaze area with the content in the gaze area, and
   wherein before determining the gaze area of the user in the virtual reality scene according to the rotation direction of the eyes in the eye tracking data, the method further comprises:
      determining the rotation direction of the eyes in a following manner: obtaining the rotation direction of the eyes by performing coordinate matrix conversion on rotation data of the eye data collection apparatus itself, and rotation and translation parameters of a central position of a display screen of a virtual reality helmet.

2. The method according to claim 1, wherein acquiring the eye tracking data of the user comprises:
   acquiring motion data of an eye data collection apparatus itself and eye image data collected by the eye data collection apparatus; and
   obtaining the eye tracking data according to the motion data of the eye data collection apparatus itself and/or the eye image data collected by the eye data collection apparatus,
   wherein the eye tracking data comprises a rotation direction of eyes and a open/closed state of the eyes.

3. An electronic device, comprising a virtual reality helmet, and a data collection apparatus and a processor arranged on the virtual reality helmet,
   the data collection apparatus comprises a tracking camera and an infrared light source, and is configured to collect eye image data of a user; and
   the processor is configured to implement the method according to claim 2.

4. A computer readable storage medium, wherein a computer program is stored on the computer readable storage medium, and when executed by a processor, the computer program implements the method according to claim 2.

5. The method according to claim 1, wherein determining the scene modifiable area according to the gaze area comprises:
 determining a non-gaze area in the virtual reality scene as the scene modifiable area according to position data of the gaze area in the virtual reality scene.

6. An electronic device, comprising a virtual reality helmet, and a data collection apparatus and a processor arranged on the virtual reality helmet,
 the data collection apparatus comprises a tracking camera and an infrared light source, and is configured to collect eye image data of a user; and
 the processor is configured to implement the method according to claim 5.

7. A computer readable storage medium, wherein a computer program is stored on the computer readable storage medium, and when executed by a processor, the computer program implements the method according to claim 5.

8. The method according to claim 1, wherein modifying the scene data of the scene modifiable area comprises:
 acquiring historical data of the gaze area, and judging a degree of attention of the scene modifiable area in the historical data of the gaze area; and
 in a case where the degree of attention is less than a threshold, modifying the scene data of the scene modifiable area.

9. An electronic device, comprising a virtual reality helmet, and a data collection apparatus and a processor arranged on the virtual reality helmet,
 the data collection apparatus comprises a tracking camera and an infrared light source, and is configured to collect eye image data of a user; and
 the processor is configured to implement the method according to claim 8.

10. A computer readable storage medium, wherein a computer program is stored on the computer readable storage medium, and when executed by a processor, the computer program implements the method according to claim 8.

11. The method according to claim 1, wherein modifying the scene data of the scene modifiable area comprises:
 in a case where it is determined that a open/closed state of eyes in the eye tracking data is closed, modifying the scene data of the scene modifiable area.

12. An electronic device, comprising a virtual reality helmet, and a data collection apparatus and a processor arranged on the virtual reality helmet,
 the data collection apparatus comprises a tracking camera and an infrared light source, and is configured to collect eye image data of a user; and
 the processor is configured to implement the method according to claim 11.

13. A computer readable storage medium, wherein a computer program is stored on the computer readable storage medium, and when executed by a processor, the computer program implements the method according to claim 11.

14. An electronic device, comprising a virtual reality helmet, and a data collection apparatus and a processor arranged on the virtual reality helmet,
 the data collection apparatus comprises a tracking camera and an infrared light source, and is configured to collect eye image data of a user; and
 the processor is configured to implement the method according to claim 1.

15. A computer readable storage medium, wherein a computer program is stored on the computer readable storage medium, and when executed by a processor, the computer program implements the method according to claim 1.

16. A dynamic changing method for a virtual reality scene, comprising:
 acquiring eye tracking data of a user;
 acquiring a gaze area of the user in the virtual reality scene according to the eye tracking data, comprising determining the gaze area of the user in the virtual reality scene according to a rotation direction of eyes in the eye tracking data;
 determining a scene modifiable area according to the gaze area; and
 modifying scene data of the scene modifiable area,
 wherein before determining the gaze area of the user in the virtual reality scene according to the rotation direction of the eyes in the eye tracking data, the method further comprises:
 determining the rotation direction of the eyes in a following manner: obtaining the rotation direction of the eyes by performing coordinate matrix conversion on rotation data of the eye data collection apparatus itself, and rotation and translation parameters of a central position of a display screen of a virtual reality helmet.

17. The method according to claim 16, wherein acquiring the eye tracking data of the user comprises:
 acquiring motion data of an eye data collection apparatus itself and eye image data collected by the eye data collection apparatus; and
 obtaining the eye tracking data according to the motion data of the eye data collection apparatus itself and/or the eye image data collected by the eye data collection apparatus,
 wherein the eye tracking data comprises a rotation direction of eyes and a open/closed state of the eyes.

18. The method according to claim 16, wherein
 determining the scene modifiable area according to the gaze area comprises:
 determining a non-gaze area in the virtual reality scene as the scene modifiable area according to position data of the gaze area in the virtual reality scene; or, determining an area within a preset range around the gaze area as the scene modifiable area.

19. The method according to claim 16, wherein modifying the scene data of the scene modifiable area comprises:
 acquiring historical data of the gaze area, and judging a degree of attention of the scene modifiable area in the historical data of the gaze area; and
 in a case where the degree of attention is less than a threshold, modifying the scene data of the scene modifiable area.

20. The method according to claim 16, wherein modifying the scene data of the scene modifiable area comprises:
 in a case where it is determined that a open/closed state of eyes in the eye tracking data is closed, modifying the scene data of the scene modifiable area.

21. The method according to claim 16, wherein modifying the scene data of the scene modifiable area comprises:
 acquiring virtual reality scene data in the gaze area; and
 matching corresponding modification content according to the virtual reality scene data.

* * * * *

UNITED STATES PATENT AND TRADEMARK OFFICE
CERTIFICATE OF CORRECTION

PATENT NO. : 11,782,505 B1
APPLICATION NO. : 17/816372
DATED : October 10, 2023
INVENTOR(S) : Tao Wu

Page 1 of 1

It is certified that error appears in the above-identified patent and that said Letters Patent is hereby corrected as shown below:

On the Title Page

Add the following section:
(30) Foreign Application Priority Data
Apr. 21, 2021 (CN) ........................... 202110431238

Signed and Sealed this
Twenty-first Day of May, 2024

Katherine Kelly Vidal
*Director of the United States Patent and Trademark Office*